W. M. RYAN.
Post Hole Digger and Transplanter.

No. 209,837.  Patented Nov. 12, 1878.

WITNESSES
Mary J. Attey.
F. J. Masi

INVENTOR
William M. Ryan,
by E. W. Anderson
ATTORNEY

UNITED STATES PATENT OFFICE.

WILLIAM M. RYAN, OF MOLINE, ILLINOIS.

IMPROVEMENT IN POST-HOLE DIGGERS AND TRANSPLANTERS.

Specification forming part of Letters Patent No. 209,837, dated November 12, 1878; application filed April 27, 1878.

*To all whom it may concern:*

Be it known that I, WILLIAM M. RYAN, of Moline, in the county of Rock Island and State of Illinois, have invented a new and valuable Improvement in Post-Hole Diggers and Transplanters; and I do hereby declare that the following is a full, clear, and exact description of the construction and operation of the same, reference being had to the annexed drawing, making a part of this specification, and to the letters and figures of reference marked thereon.

Figure 1:
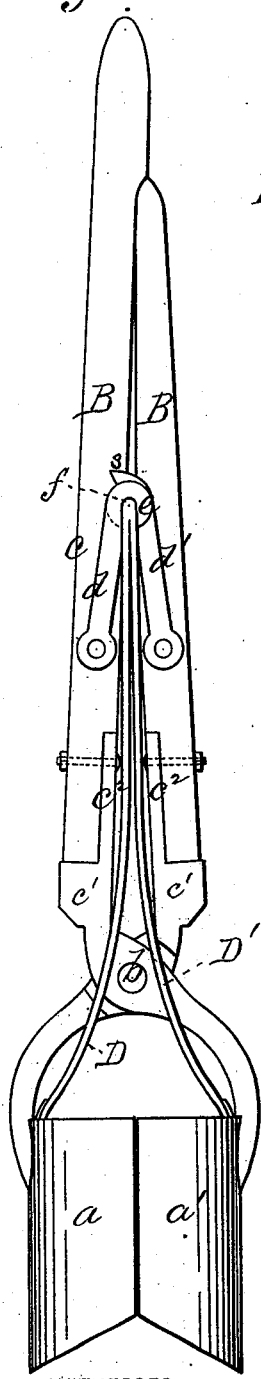
Figure 2:
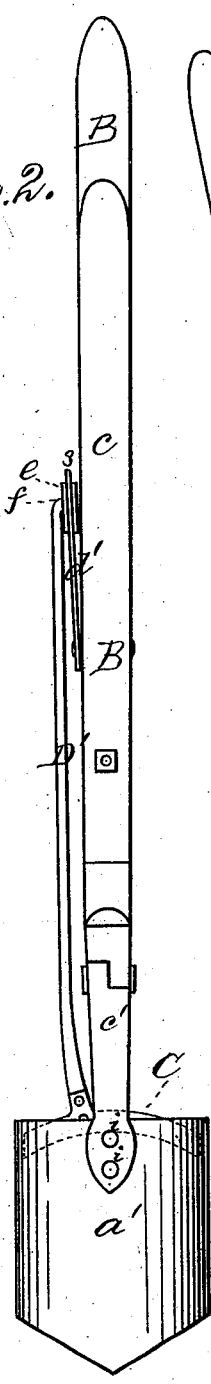
Figure 3:
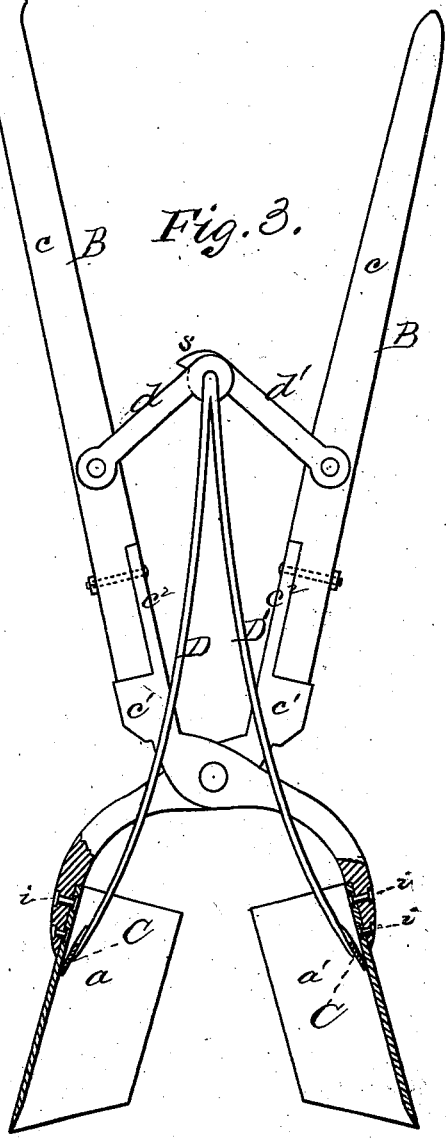

Figure 1 of the drawing is a representation of a side view of my improved post-hole digger and transplanter. Fig. 2 is an edge view of the same; and Fig. 3 is a side view thereof, partly open, with the shovels in section, showing the scrapers.

This invention has relation to improvements in post-hole diggers and transplanters; and the nature of the invention consists in combining with the digger a cleaning device which descends into the shovel when the handles are opened, forcing out the soil and scraping the inside of said shovels clean, as will be hereinafter more fully set forth.

In the annexed drawing, $a'$ $a$ designate the shovels, and B the handles, of my improved digger. These handles are pivoted together at $b$ in the usual manner, and the wooden parts $c$ thereof are socketed into the metallic parts $c^1$, and confined thereto by means of a bolt and nut, or two of them, extending through the wooden parts, and a tang, $c^2$, of the metallic parts, as shown in Fig. 3. The shovels $a$ $a'$ are secured to the parts $c^1$ of the handles B by means of rivets $i$, the heads of which are countersunk so as to be flush with the surface of the said shovels. The handles B are connected together by the toggle-jointed rods $d$ $d'$, connected together by a rule-joint, $e$.

C represents the scrapers, snugly fitting against the inner faces of the shovels and conforming to the curvature thereof. These shovels are strongly secured to the lower ends of the spring-handles D D', that extend upward between the handles B, and, being merged in a single stem, $f$, form the pivot of the rods $d$ $d'$. This is accomplished by bending this stem at right angles to the length of the rods, passing it through registering perforations in the parts of the joint $e$, and forming a head upon its projecting end, or by forming a screw-thread upon the said end and applying a nut thereon. This latter construction obtains when it is sought to render the scrapers removable. When the shovels $a$ $a'$ are closed the arms are closed in upon each other, as shown in Fig. 1.

The transplanter is forced into the soil in the usual mode, and when withdrawn therefrom brings up a clod of earth between the shovels. When the handles are spread to drop the clod the rods $d$ $d'$ are wholly or partly straightened out, thrusting the scrapers down inside of the shovels, with their lower edges against them, thereby expelling the clod and scraping off any adherent clay or earth therefrom.

The arms D D' are made of spring-steel, and in order to pass the scrapers into the shovels the said arms must be compressed. By this means, as the handles B are opened the rods D D' react and hold the scrapers against the shovels.

In order to prevent the rods D D' from dropping down in a position the reverse of that shown in Fig. 1 when the handles B B are opened and the rods D D' in line with each other, the male branch of the rule-joint $e$ is provided with an angular projecting stop, $s$, that, coming in contact with the female branch thereof, prevents it from flexing downward beyond the straight line.

What I claim as new, and desire to secure by Letters Patent, is—

1. The combination, with the shovels $a$ $a'$ of a transplanter or post-hole digger, of the scrapers C, thrust down the inside of said shovels by the opening of the handles, substantially as specified.

2. The combination, with the post-hole digger $a$ $a'$ B, of the toggle-jointed rods $d$ $d'$, the diverging spring-rods D D', and the scraping-blades C C, substantially as specified.

3. The combination, with the transplanter $a$ $a'$ B, of the rods $d$ $d'$, rule-jointed together, and provided with a stop, $s$, the diverging spring-rods D D', and the scrapers C on the ends of the said rods, substantially as specified.

In testimony that I claim the above I have hereunto subscribed my name in the presence of two witnesses.

WILLIAM M. RYAN.

Witnesses:
H. P. PIERCE,
D. S. LEWIS.